United States Patent [19]

Wellington et al.

[11] Patent Number: 5,063,772

[45] Date of Patent: Nov. 12, 1991

[54] METHOD FOR TROUBLESHOOTING GAS-LIFT WELLS

[75] Inventors: Scott L. Wellington; Jeffrey F. Simmons; Edwin A. Richardson, all of Houston, Tex.

[73] Assignee: Shell Oil Company, Houston, Tex.

[21] Appl. No.: 542,371

[22] Filed: Jun. 22, 1990

Related U.S. Application Data

[62] Division of Ser. No. 323,600, Mar. 14, 1989, Pat. No. 4,972,704.

[51] Int. Cl.$^5$ .............................................. G01M 3/04
[52] U.S. Cl. ................................. 73/40.7; 73/861.05; 73/861.07; 166/250; 166/337
[58] Field of Search ................. 73/40.7, 155, 861.05, 73/861.07, 861.95; 166/250, 254, 255, 337, 372

[56] References Cited

U.S. PATENT DOCUMENTS

| | | | |
|---|---|---|---|
| 2,383,455 | 8/1945 | Abadie | 137/77 |
| 4,055,399 | 10/1977 | Parrish | 73/155 |
| 4,474,053 | 10/1984 | Butler | 73/40 |
| 4,515,007 | 5/1985 | Herman | 73/40.7 |
| 4,738,313 | 4/1988 | McKee | 166/372 |
| 4,972,704 | 11/1990 | Wellington et al. | 73/61 R |

FOREIGN PATENT DOCUMENTS 862891 3/1961 United Kingdom .

*Primary Examiner*—Hezron E. Williams
*Assistant Examiner*—Craig Miller

[57] ABSTRACT

A method is provided for troubleshooting gas-lift wells, to identify whether gas-lift valves on the production tubing are open or closed, without the use of wireline tools. The method may also be used to detect leaks in the production tubing or in the well casing. A quantity of a tracer gas is injected into the lift-gas at the wellhead, and its return in fluid produced from the well is monitored as a function of time. The tracer's return pattern may be correlated with the depth of entry points and volumes of lift-gas entering along the length of the production tubing.

4 Claims, 2 Drawing Sheets

METHOD FOR TROUBLESHOOTING GAS-LIFT WELLS

This is a division of application Ser. No. 323,600, filed Mar. 14, 1989, U.S. Pat. No. 4,972,704 and is related to application Ser. No. 07/542,372, filed June 22, 1990.

BACKGROUND OF THE INVENTION

This invention concerns the field of production of oil and other reservoir fluids from subterranean reservoirs, and particularly the use of gas-lift well systems. The invention provides a new method for troubleshooting gas-lift wells. It allows detection of leaks in production tubing and casing without the use of wireline tools, and it is particularly useful for determining whether the valves in a gas-lift well are operating properly.

Prior methods of detecting leaks in wells have involved the use of wireline tools. For example, U.S. Pat. No. 2,383,455 discloses a method for detecting casing leaks in a subterranean well by measuring the temperature gradient of the well. A thermal recorder is lowered through the production tubing in the well to measure the temperature gradient of the well. A temperature anomaly at a given depth is indicative of a leak at that depth. It is also known in the art to use other wireline tools, such as mechanical calipers, sonic, or noise detection tools, to detect tubing and casing leaks in wells.

Such wireline tool methods have several disadvantages for the well operator. The methods are usually performed by a well service company on a contract basis, which involves additional operating costs and lost time during well evaluation. It is usually necessary to shut down operations on the well, at least during insertion and removal of the tools. Specialty tools are used, and interpretation of the results often requires expert analysis. There is also some risk associated with inserting tools into a well, since if the tool is irretrievably lost in the well, it may be necessary to implement expensive remedial operations, or abandon the well. Consequently, the expense and risk associated with using these wireline tool methods are significant disadvantages for the well operator.

A method which does not involve the use of wireline tools has been developed for detecting casing leaks in underground storage caverns. U.S. Pat. No. 4,474,053 discloses a method for detecting casing leaks in an underground cavern used to store hydrocarbons. An inert gas is maintained under pressure in the annulus between two casings, and the pressure of the inert gas is continuously monitored at the wellhead. A decrease in pressure of the inert gas at the wellhead is indicative of a leak in the casing.

In the subject invention, a new method is disclosed that allows detection of production tubing and casing leaks in gas-lift wells, without the use of wireline tools. The method may also be used to detect whether gas-lift valves on the production tubing in a gas-lift well are open or closed. This new method eliminates the cost and risk associated with the use of wireline tools. The method is also simple, and easy for field personnel to perform with minimal equipment. The results obtained are easy to interpret, allowing operating personnel to troubleshoot wells at the well site and without the need to consult off-site experts.

SUMMARY OF THE INVENTION

The subject invention provides a simple, inexpensive method for troubleshooting a gas-lift well system. The method is performed while the well is in operation, and without the use of wireline tools. The method may be used to determine whether gas-lift valves on a production tubing string are open or closed, and to identify whether there are leaks in the production tubing or casing.

Application of the method requires the use of an injected fluid, which is injected into the lift gas at the well in a quantity that will provide a detectable amount of a tracer in a produced fluid recovered from the well. The injected fluid is and/or generates one or more tracers in one or more of the reservoir fluids produced from the well. The presence of the tracer is detected in the produced fluid as a function of time. As an alternative, a reduction in the proportion of one or more components present in a produced fluid, occurring due to the presence of a tracer in the produced fluid, is monitored as a function of time. This information may be used to determine the point or points of entry of the injected fluid into the production tubing, thereby determining the point or points of entry of the lift-gas into the production tubing. Consequently, it is possible to determine which of several gas-lift valves are open or closed on the production tubing, and whether there are any other openings, such as leaks, in the production tubing. By monitoring the proportion of tracer present in the produced fluid as a function of time, it is possible to quantify the amount of lift-gas entering the production tubing at each point of entry. Through material balance calculations on the tracer, to determine whether any tracer is lost from the casing, the method may also be useful for detecting the presence (or absence) of casing leaks.

Other purposes, distinctions over the art, advantages and features of the invention will be apparent to one skilled in the art upon review of the following.

DETAILED DESCRIPTION OF THE INVENTION

Figure 1:
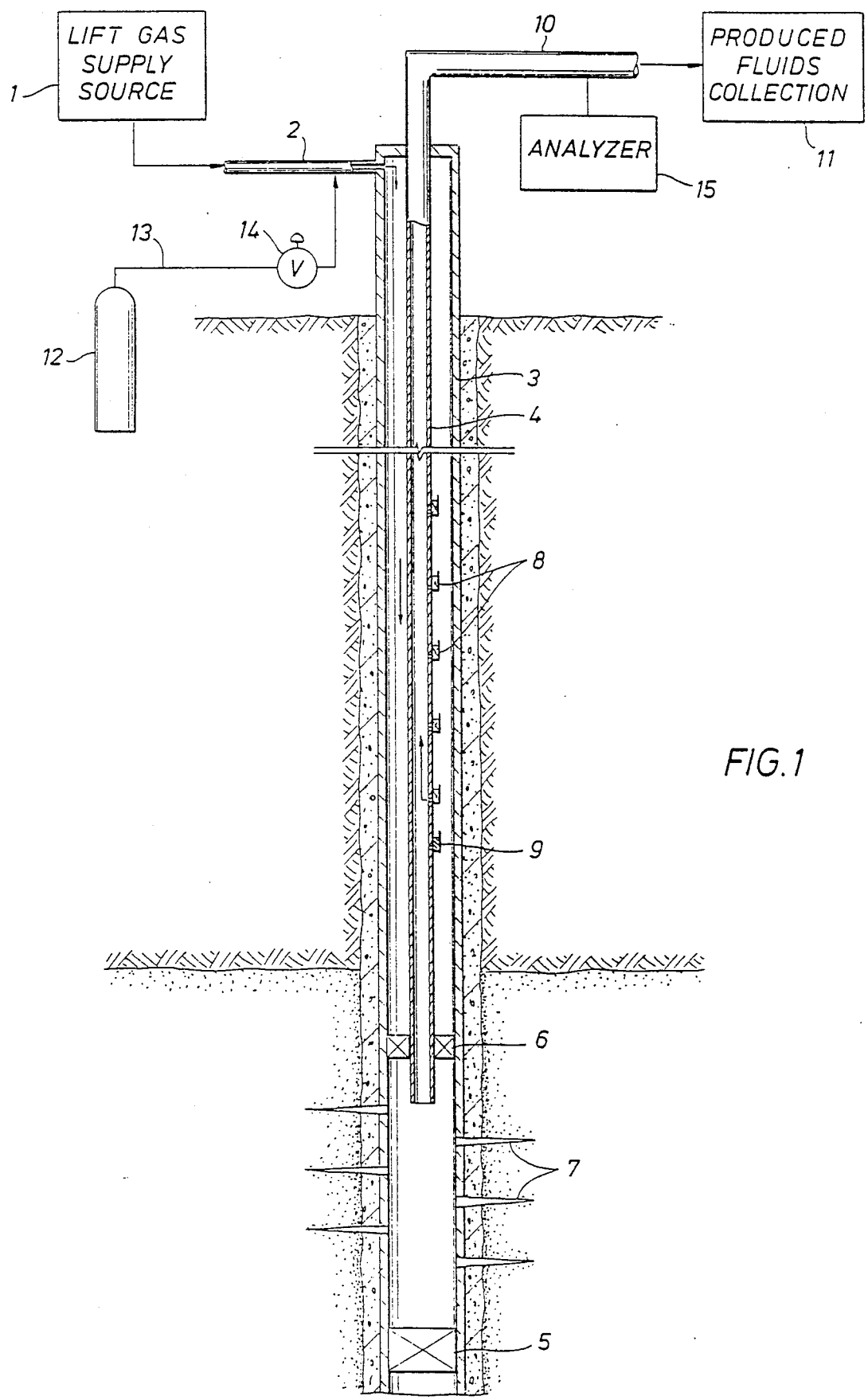
FIG. 1 is a schematic diagram of a gas-lift well system.

Gas-lift is an important method for artificially lifting reservoir fluids from a subterranean reservoir to the surface when natural forces are insufficient. It is widely used, primarily for oil wells and particularly in offshore wells, but also occasionally for water wells. A source of high pressure gas must be available. Usually, gas produced with the oil is treated and compressed in a field compressor for use as the lift-gas. In a gas-lift system, gas is injected into the annulus between the casing and the production tubing, and enters the production tubing through a gas-lift valve, causing an increase in the gas-liquid ratio inside the tubing above that gas-lift valve. Multiple gas-lift valves are usually included in the production tubing at multiple depths to unload the well initially and to establish the initial point of gas injection, which is usually above the total depth of the well.

During initial start-up of the well, the gas-lift valves are initially open. As fluid in the casing and production tubing is lifted from the well, pressure decreases in the annulus between the casing and the production tubing. The gas-lift valves in the production tubing have pressure settings that decrease with depth. Consequently, the valves close in sequence from the top of the well to the bottom of the well, until only the bottom gas-lift valve is left open, and production from the bottom gas-lift valve is established. Most well designs call for only one gas-lift valve to be open once continuous production is obtained. Since reservoir pressures generally decline over time, it is usually necessary to inject lift gas deeper in the well over the life of a project. Consequently, the production tubing may initially contain "dummy" gas-lift valves at the lowest points on the tubing that may be replaced, when necessary, with active gas-lift valves. The lower active gas-lift valve would then be used as a new, lower point for continuous gas injection.

In a gas-lift well, it is necessary to periodically check to see if the gas-lift system is operating properly. Once the well is onstream, only the bottom gas-lift valve should be open. Occasionally, a gas-lift valve above the bottom gas-lift valve will remain open. The lift-gas entering the production tubing from that valve is essentially wasted, since the lift-gas entering at the bottom of the well is sufficient to provide production at the well. Also, the bottom gas-lift valve may occasionally fail closed, resulting in inefficient operation of the gas-lift system. In addition, leaks in the production tubing may also serve as entry points for lift-gas. If excess lift-gas enters the production tubing, it will decrease the production of oil from the well and increase operating costs due to the wasted excess gas.

The present invention provides an inexpensive, low-risk method for determining whether gas-lift valves along the production tubing are open or closed. The method may also be used to detect leaks in the production tubing or casing. No wireline tools are required, and the method may be applied to a well while it is in operation. The results obtained are easy to interpret, allowing operating personnel to troubleshoot wells at the well site, and without the need to consult experts away from the well.

A key advantage of the invention is its simplicity. Where analytical equipment is used to detect or monitor and to automatically record the presence and/or proportion of a tracer in a produced fluid, the equipment may be set up by operating personnel who may then proceed to do other tasks until the recorded data are available for analysis. For example, where a graphic representation of the concentration of tracer present in a produced fluid as a function of time is obtained, it is very simple for the operating personnel to identify the number of entry points on the production tubing, and the relative proportions of lift-gas entering the production tubing at each point. In a well that is operating properly, only one, well defined peak will occur at an expected response time, representing one open gas-lift valve at the proper depth on the production tubing. After operating personnel become familiar with using the method, it may be possible for such personnel to simply look at a graphical representation of the data obtained from application of the subject invention, and determine whether a gas-lift well is operating properly. Since wells in a given field are often similarly designed, the same pattern may be exhibited by most of the wells in a field.

The following is a detailed description of an apparatus used in the method of the subject invention, with specific reference to FIG. 1. A lift-gas supply source 1 supplies lift-gas through a lift-gas supply line 2 into a gas-lift well. The lift-gas supply line 2 includes a gas measuring device, such as an orifice meter (not shown). The lift-gas enters the annulus between the well casing 3 and the production tubing 4. The well casing may be plugged at the bottom of the well with a bridge plug 5. The production tubing 4 is anchored near the bottom of the well with a packer 6, which also serves to isolate the annulus between the well casing 3 and production tubing 4 from the producing zone, identified by perforations 7 in the casing. Reservoir fluids from the formation enter the casing through perforations 7, and are lifted up the production tubing. There are several gas-lift valves 8 along the length of the production tubing at multiple depths. A dummy valve 9 may also be included near the bottom of the production tubing but above the packer 6. Fluids produced from the well exit from the well through a produced fluid line 10 and flow to a produced fluids collection facility 11. To start up the well, lift gas is injected into the annulus between the casing and the production tubing, to provide lift for fluids between each gas-lift valve and the surface. The gas-lift valves are initially open. Once some flow is established, the gas-lift valves close automatically as the pressure in the annulus between the casing and the production tubing declines, until only the bottom gas-lift valve is left open.

In order to apply the method of the subject invention to a well, it is necessary to know certain basic information about the well, such as the volume of the annulus between the casing and the production tubing per unit of depth, the approximate location/depth of the lift-gas valves included in the production tubing, and the flow rate for lift-gas supplied to the well system. From this information, the time required for the injected fluid or tracer to return to the surface in a produced fluid, the expected response time, may be calculated.

The following is a detailed description of the method of the subject invention, with specific reference to FIG. 1. As shown in FIG. 1, an injected fluid supply source 12 is connected to the lift-gas supply line 2 by an injected fluid supply line 13, which contains at least one valve 14. The injected fluid is and/or generates one or more tracers in one or more reservoir fluids. A quantity of an injected fluid, which is sufficient to provide a tracer in a quantity that will be detectable in a produced fluid recovered from the well, is injected as a pulse into the lift-gas supply line 2 near the well. The lift-gas, containing injected fluid, travels down the annulus between the well casing 3 and the production tubing 4, entering any openings along the production tubing. The injected fluid enters the production tubing with the lift-gas and comingles with the reservoir fluids. Some injected fluids generate tracers when combined with reservoir fluids. An analyzer 15 is attached to the produced fluid line 10. A separator (not shown) may be associated with the analyzer to segregate a particular produced fluid for analysis. The analyzer 15 is used to detect the presence and/or monitor the proportion of a tracer, which may be the injected fluid and/or a tracer generated by the injected fluid, in a produced fluid as a function of time. The analyzer may be connected to a recorder (not shown) to provide a graphical representation of the data. By knowing the volume of the annulus between the production tubing and the well casing per unit of depth, and the flow rate of the lift-gas supplied to the well, it is possible to determine the point of entry of the injected fluid along the depth of the production tubing from the tracer data. By determining the point of entry of the injected fluid into the production fluid, the point of entry of the lift-gas into the production tubing may also be determined. There may be several points of entry of lift-gas along the production tubing. Multiple entry points indicate open gas-lift valves and/or tubing leaks. By knowing the number and approximate depths of the various gas-lift valves, it is possible to determine which valves are open, which valves are closed, and whether there are any leaks in the production tubing.

Any of a variety of injected fluids may be used in the practice of the subject invention. The injected fluid must be injectable in a sufficient quantity and over a short time period such that it, or any tracer it generates may be detected in and distinguished from fluids produced from the well. Gases are preferred for their ease of use and miscibility with the lift-gas. Examples of such gases include carbon dioxide, nitrogen, nitric oxide, ammonia, hydrogen, oxygen, sulfur dioxide, and halogenated hydrocarbons such as freon. Each of these gases may be used as tracers, and several will also generate additional tracers when in contact with reservoir fluids. For example, carbon dioxide, when in contact with water, generates disassociated carbonic acid ions, either of which may serve as a tracer in the produced water. Radioactively tagged versions of such materials may also be used.

Since the injected fluid, or any tracer it generates, is detectable in a produced fluid, it is also possible to indirectly determine the presence of the tracer in a produced fluid. Each produced fluid has one or more components, for example, the produced gas contains both gas from the formation and injected lift-gas. The lift-gas itself contains methane and a variety of other component gases. The proportion of tracer present in the produced fluid is indirectly determined by monitoring a reduction in the proportion of one or more components present in the produced fluid, where the reduction has occurred due to the presence of a tracer in the produced fluid. In effect, a reduction in the proportion of a component present in a produced fluid serves as a tracer.

It is preferable to inject the injected fluid as a pulse, or large quantity over a short period of time. This allows the use of peak analysis for the tracer to determine the entry points of the injected fluid, and thereby the lift-gas, into the production tubing. As an alternative, some minimum constant concentration of injected fluid is injected continuously, and frontal analysis is used to determine entry points into the production tubing. However, the continuous injection method could require a greater quantity of injected fluid than the pulse injection method.

Any of a variety of conventional analyzers may be used to detect and/or monitor the tracer in the produced fluids. The analyzer is selected based on the tracer to be detected and the produced fluid to be analyzed. Some analyzers are sensitive to the presence of certain foreign materials, for example, water in a gas stream analyzer. Consequently, it may be desirable to include a small separator to selectively segregate a particular phase or portion from the produced fluids, such as a dry gas stream. The analyzer is calibrated to the fluid analyzed, and it may be necessary to subtract off a background level of tracer in the produced fluid. For example, where carbon dioxide is used as the tracer, the produced fluids may already include some minimal quantity of carbon dioxide. It is desirable to connect the analyzer to a recorder, which may provide a graphical representation of the data.

In a preferred method of the subject invention, the injected fluid is carbon dioxide, and carbon dioxide serves as the tracer. The carbon dioxide is supplied to the lift-gas as a condensed fluid, which allows injection of a quantity sufficient to be detected in produced fluids recovered from the well in a short amount of time. The carbon dioxide is supplied from a gas cylinder obtained from a gas supply manufacturer. Characteristics of the well are used to calculate an estimated time for the injected carbon dioxide to return in the produced fluids. The presence of the carbon dioxide is preferably detected in the produced gas from the well. A slip stream of produced gas is obtained by installing a small separator on the produced fluid line. The gas obtained from the separator is directed to a carbon dioxide analyzer. The concentration of carbon dioxide in the produced gas is determined as a function of time and plotted by an analog recorder. By knowing the lift-gas supply rate and the volume of the annulus between the well casing and the production tubing per unit of depth, it is possible to correlate peaks of carbon dioxide in the produced gas with points of entry of the carbon dioxide into the production tubing, thereby determining the points of entry of the lift-gas into the production tubing. By knowing the number and depths of the gas-lift valves along the production tubing, it is possible to determine whether those valves are open or closed, and whether there are any leaks in the production tubing.

A number of alternate methods may be used to obtain the same results. For example, where the injected fluid or tracer is soluble in oil, such as carbon dioxide, it is also possible to detect the tracer in the produced oil. As another alternative, where the injected fluid or tracer is soluble in water, it is possible to detect the tracer in the produced water. For example, carbon dioxide, when in contact with water, generates disassociated ions of carbonic acid, which may be readily detected in the produced water by pH measurements. The carbon dioxide both serves as a tracer itself, in both the produced gas and the produced oil, and generates two tracers (hydrogen carbonate ion and hydrogen ion) in the produced water. Where carbon dioxide is employed as the injected fluid, and hydrogen ion is employed as the tracer in the produced water, the presence of the tracer may be identified simply through pH measurements.

Ammonia is another gas that may be used as an injected fluid and monitored in the produced gas or oil. When in contact with water, ammonia generates disassociated ions of ammonium hydroxide (ammonium ions and hydroxide ions). The hydroxide ions are readily detected in the produced water by pH measurements. When the hydrogen ion concentration, or pH, indicates the proportion of tracer present, the pH of the produced water is measured as a function of time and the peaks (or valleys) are correlated with entry points along the tubing. Where pH is monitored as an indicator of the tracer, it may be possible to simply include a pH detector in a slipstream on the produced fluid line. Detectors for other tracers, such as ammonium ions, could be similarly employed.

It is also possible to monitor for a parameter that serves as an indirect indication of the presence of a tracer. For example, if nitrogen is used as a tracer, rather than monitoring the produced gas for the presence of nitrogen, the produced gas could be monitored for BTU content as a function of time. The BTU content of the produced gas would decline as the proportion of nitrogen present in the produced gas increased. Thus, BTU content would serve as an indirect indication of the proportion of the tracer present in the produced gas as a function of time. A BTU measuring device could be installed on a slip stream on the produced fluid line. Again, indications of the portion of the tracer present in a produced fluid as a function of time may be used as described above to determine whether valves installed in the production tubing are open or closed, and whether there are leaks in the production tubing.

The method may also be used to quantify the amount of gas entering at a given point along the production tubing. Where a graphical representation of peaks, indicating the proportion of tracer present as a function of time is obtained, the fraction of tracer entering at each entry point along the production tubing may be determined by integrating the area under each peak and ratioing the area of each peak to the sum of the areas under all of the peaks. By knowing the amount of lift gas supplied to the well, it is possible to quantify the amount of lift gas entering the production tubing at each point of entry.

The method may also be used to detect casing leaks, where fluids from the well are leaking from the casing. By performing a material balance on the injected fluid and/or tracer entering and exiting from the well, it is possible to determine whether some of the injected fluid or tracer is lost, indicating a casing leak. If a casing leak is located above the bottom gas-lift valve, a longer than expected response time also indicates a casing leak.

In order to present a clear understanding of the present invention, the method will now be described in more detail by means of examples. As will be understood, prior to applying the method to a particular gas-lift well, it is desirable to obtain specific information about the well, such as the volume of the annulus between the production tubing and the well casing per unit of depth, the approximate location of gas-lift valves along the production tubing, and the flow rate of the lift-gas to the well. Also, it may be desirable to perform certain preliminary calculations, such as estimating an expected response time, the amount of time that will elapse between injection of the injected fluid into the lift-gas line and the first exit of some the tracer in fluids produced from the well. Such calculations are useful in planning the troubleshooting procedure for a well.

Various modifications of the present invention will become apparent to those skilled in the art from the foregoing description and the following examples. Such modifications are intended to fall within the scope of the appended claims.

EXAMPLE 1

The method of the subject invention was applied to a gas-lift well in Louisiana. The flow rate of the lift-gas entering the well was metered by a standard orifice plate method. The lift-gas at the well was injected at a pressure of 1,150 psi and supplied at a rate of 345,000 standard cubic feet per day (SCF/D). (An accurate measurement of the lift-gas flow rate is important in these calculations.) The well was known to have an annulus volume of 1 cubic foot per 5.433 linear feet. At average casing pressure and temperature, this resulted in a linear velocity for the lift-gas of about 986 feet per hour in the annulus. Because the cross-sectional area of the casing-tubing annulus was much greater than the cross-sectional area of the production tubing, and because the production tubing operated at lower pressure, the velocity of the gas in the annulus was much less than the velocity of the gas returning in the production tubing. Consequently, the amount of time required for lift-gas entering the well to return to the surface, the expected response time, was assumed to be approximately equal to the amount of time required for the lift gas to travel down the annulus and enter into the production tubing. (This assumption would be valid for most wells; however, a correction for travel in the production tubing could be made.) The well was known to have five gas-lift valves along the production tubing, with the bottom three valves located at approximately 3,592 feet, 4,100 feet, and 4,593 feet. Assuming only the bottom gas-lift valve was open on the production tubing, and that there were no leaks in the production tubing, the expected response time was calculated as 280 minutes.

Carbon dioxide was selected as the injected fluid/tracer due to its low cost and ease of use. In order to inject the gas over a minimum amount of time into the lift-gas line operating at 1,150 psi, the carbon dioxide was supplied as a condensed gas. A gas cylinder containing about 60 pounds of carbon dioxide under a nitrogen blanket was obtained from a gas supply manufacturer. The gas cylinder was connected to the lift-gas line with some stainless steel tubing.

A slipstream of produced gas was separated from the produced fluids line through use of a three-stage, low pressure separator, similar to those commonly available in the field. An infrared (IR) spectrometer was used to continuously measure and digitally record the concentration of carbon dioxide present in the produced gas. The IR analyzer was connected to an analog chart recorder, to provide a graphical representation of the concentration of carbon dioxide present in the lift-gas as a function of time.

Figure 2:
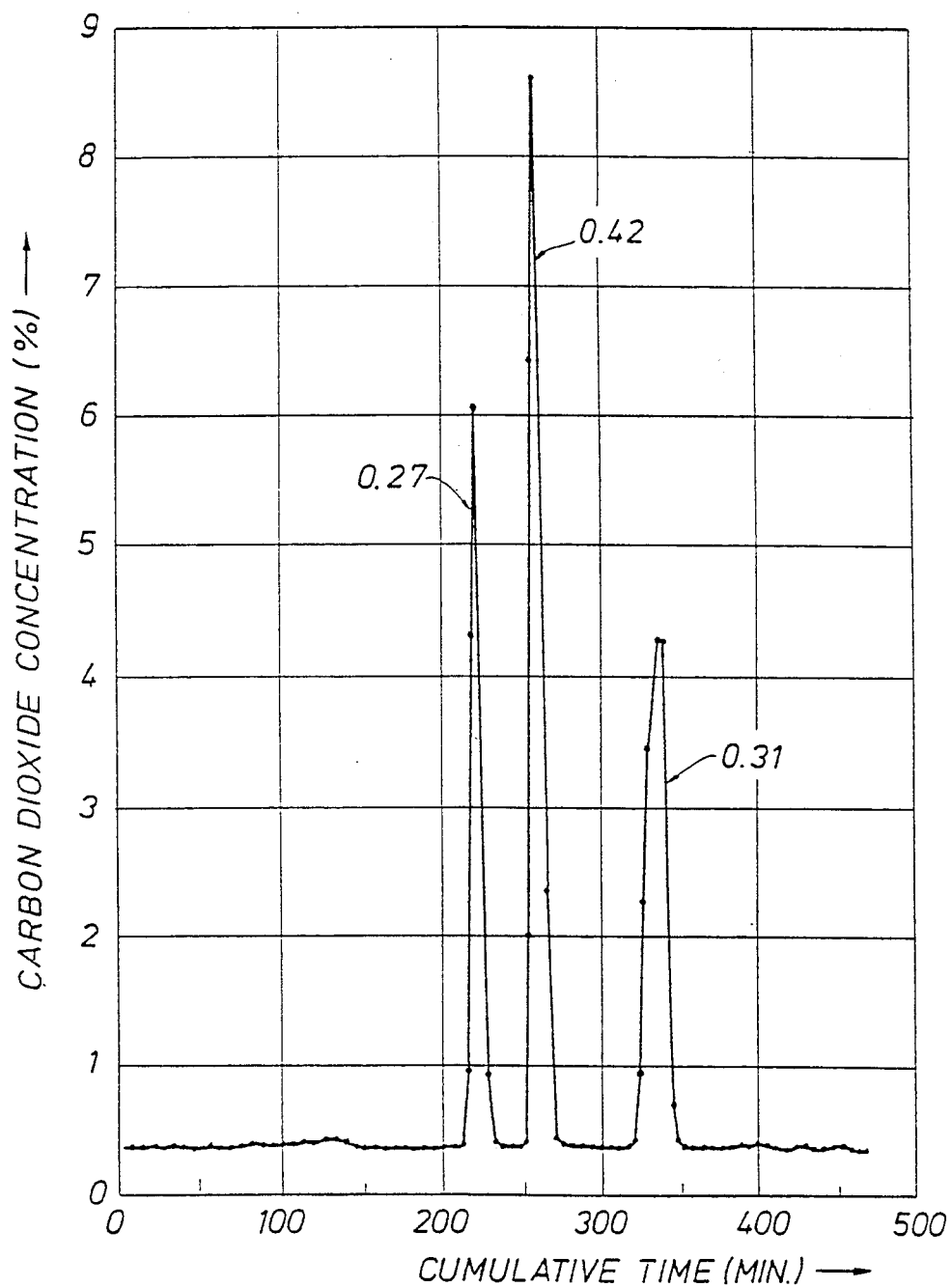
FIG. 2 shows the concentration of tracer in gas produced from a gas-lift well, resulting from application of the method of the subject invention.

To start the test, the valve on the gas cylinder was opened, allowing the carbon dioxide to enter the lift-gas line. It was expected that carbon dioxide would be detected by the analyzer in the produced gas slip-stream about 280 minutes later. However, after only 221 minutes, a peak representing entry of carbon dioxide into the production tubing was identified by the analyzer. Subsequent peaks occurred at about 265 minutes and 341 minutes. These results indicated that more than one gas-lift valve was open on the production tubing and/or that the production tubing had a leak. A graphical representation of these results is shown in FIG. 2.

Since it was clear from this analyzer data that there were three entry points into the production tubing, it was concluded that further analysis of the data would be required. The first entry point was calculated by multiplying the linear velocity of the lift-gas (986 feet per hour) by the acual response time (221/60=3.68 hours), which indicated entry of the lift-gas into the production tubing at about 3,631 feet. The gas-lift valve closest to this entry point is located at a depth of about 3,592 feet. Since the well was new, and a tubing leak was therefore unlikely, it was concluded that entry point occurred at the closest gas-lift valve, which was only 39 feet away. (Data on the location of gas-lift valves along the production tubing are not always strictly accurate.)

Above the first point of entry, the entire gas flow rate to the well contributed to the linear velocity of gas in the annulus. However, once some gas entered the production tubing, that linear velocity was reduced below the point of entry by the fraction of total gas that entered the production tubing. The relative contribution of each point of gas entry was estimated from the relative size of each carbon dioxide peak. By integration, it was determined that 27 percent of the lift-gas entered at the first entry point, 42 percent at the second entry point, and 31 percent at the third entry point, as noted on FIG. 2. Thus, the linear velocity of gas traveling between the first entry point and the second entry point was calculated to be 720 feet per hour (73 percent of 986 feet per hour).

The second entry point was calculated by adding the product of this flow rate to the second entry point (720 feet per hour) and the incremental time of travel between the first and second entry points (265−221=44 minutes, or 0.73 hours) to the depth of the first entry point (3,631+527=4,158 feet). Since this depth was within 58 feet of a gas-lift valve located at about 4,100 feet, it was assumed that lift-gas was entering the production tubing at this gas-lift valve. The third entry point was similarly calculated to be 4,545 feet. The calculated value for the third point of entry (4,545 feet) was 48 feet from the bottom gas-lift valve located at about 4,593 feet. It was concluded that lift-gas was entering the production tubing at this bottom valve.

The results of these calculations were summarized in Table 1. Calculated response or entry point depths were compared with assumed depths of the bottom three gas-lift valves, and the difference in depth was calculated. This difference was also expressed as a percentage of the assumed valve depth. The percent difference showed an accuracy of ±1.5 percent, excellent accuracy by oil field standards.

TABLE 1

GAS-LIFT ANALYSIS TEST RESULTS

| CALCULATED RESPONSE DEPTH (in feet) | INSTALLED VALVE DEPTH (in feet) | DEPTH DIFFERENCE (in feet) | PERCENT DIFFERENCE |
|---|---|---|---|
| 3,631 | 3,592 | +39 | +1.1 |
| 4,158 | 4,100 | +58 | +1.4 |
| 4,545 | 4,593 | −48 | −1.0 |

The amount of lift-gas entering each valve was calculated from the lift-gas supply rate and the fraction of lift-gas entering at each entry point. The first valve allowed 27 percent of the lift-gas to enter the production tubing, or 93,150 SCF/D (27 percent of 345,000 SCF/D). The amounts for the second and third valves were similarly calculated to be 144,900 SCF/D and 106,950 SCF/D, respectively.

Since it was expected that only one peak would be identified, the analyzer may have been set for too coarse of a time interval to allow optimum accuracy. Also, less carbon dioxide could have been used. If the test had been repeated, better peak definition and better correlation between gas entry points and actual gas-lift valve depths would have been obtained. Alternative calculation methods could have been used. For example, the flow rate of lift-gas entering a gas-lift valve (or production tubing leak) may be calculated from the ratio of the gas velocities above and below each point of entry.

EXAMPLE 2

In this hypothetical example, the characteristics of the well are similar to the well described in Example 1. The well has an annulus volume of 1 cubic foot per 5.433 linear feet, and the lift-gas flow rate is determined to be 350,000 SCF/D. The linear velocity of the lift-gas at average well conditions is 1,000 feet per hour. Carbon dioxide is used as the tracer and monitored in the produced gas, as in Example 1. The bottom active gas-lift valve is located at approximately 5,000 feet. Assuming no leaks in the casing, the tracer will reach the open gas-lift valve and return to the surface in five hours.

However, there is no peak after five hours, and the peak occurs only after six hours, one hour later than expected. As in Example 1, the total response time for the tracer is the time it takes for the tracer to reach the furthest point of entry on the production tubing. Since the actual response time is greater than the expected response time, this indicates that the velocity is reduced due to a leak from the casing above the bottom open gas-lift valve. It is determined, by quantifying the carbon dioxide in the produced gas, that only 75 percent of the carbon dioxide returns. Consequently, 25 percent of the tracer is lost to the leak.

The linear velocity of the lift-gas above the leak is known to be 1,000 feet/hour. If the 25 percent of the lift-gas is lost to a leak, then the linear velocity of the lift-gas traveling between that leak and the bottom gas-lift valve is 75 percent of that velocity, or 750 feet/hour. Knowing these two linear velocities, it is possible to calculate the depth of the leak as follows:

$$t_r = \frac{(d_{bv})(x)}{v_1} + \frac{(d_{bv})(1-x)}{v_2}$$

where:
$t_r$ = Response time for the tracer.
$d_{bv}$ = Depth of bottom gas-lift valve.
$x$ = Fraction of the depth to the bottom gas-lift valve at which a leak exists.
$v_1$ = Gas velocity above casing leak.
$v_2$ = Gas velocity below casing leak.

It is known that the response time for the tracer is six hours, the depth of the bottom gas-lift valve is 5,000 feet, the gas velocity above the casing leak is 1,000 feet/hour, and that the velocity of the gas below the casing leak is 750 feet/hour. It is calculated that $x = 0.40$, and that the depth of the casing leak is 40 percent of the depth to the bottom gas-lift valve, resulting in a casing leak depth of 2,000 feet.

In the alternative, if a casing leak is below the open gas-lift valve, a partial loss of the tracer will again occur; however, the remaining tracer will return at the expected response time. This is because the linear velocity of the lift-gas will be the calculated value based on the supply rate when the lift-gas enters the open gas-lift valve. Consequently, it is not possible to determine the depth of a casing leak located at or below the bottom gas-lift valve, only that the casing leak is at a depth equal to or greater than the open gas-lift valve depth. The leak may be quantified through material balance calculations on the tracer.

EXAMPLE 3

In this hypothetical example, the characteristics of the well are similar to the well described in the examples above. The linear velocity of the lift-gas at average well conditions is 1,000 feet/hour, and the bottom active gas-lift valve is located at a depth of 5,000 feet. Carbon dioxide is used as the tracer and monitored in the produced gas, as in Example 1. The expected response time for the well, the elapsed time at which injected tracer should return to the surface, is calculated to be five hours. The presence of a tracer is detected in a well-defined peak at about five hours after the tracer entered the well. It is concluded that the well's gas-lift system is operating properly, with lift occurring solely off the bottom active gas lift valve. Since most of the other wells in the field are similarly designed, most of the wells have the same expected response time. Consequently, the other wells are similarly checked to see whether they are operating properly.

What is claimed is:

1. A method for identifying a leak in a casing in a gas-lift well in a subterranean reservoir comprising:
   injecting into lift-gas supplied to the well a quantity of an injected fluid, which is at least one of (1) a tracer and (2) a component which generates a tracer, the tracer being sufficient to be detected in a produced fluid recovered from the well;
   monitoring a proportion of the tracer in the produced fluid as a function of time;
   quantifying the amount of the tracer returning from the well;
   determining that the amount of the tracer returning from the well is less than the amount that would return without any loss of the tracer, thereby identifying a leak in the casing.

2. A method for determining the presence of a leak in a casing in a gas-lift well in a subterranean reservoir comprising:
   determining an expected response time for the gas-lift well, which would indicate that only an appropriate gas-lift valve is open;
   injecting into lift-gas supplied to the gas-lift well a quantity of an injected fluid, which is at least one of (1) a tracer and (2) a component which generates a tracer, the tracer being sufficient to be detected in a produced fluid from the well;
   detecting the presence of the tracer in the produced fluid as a function of time;
   identifying the actual response time for the well;
   determining the presence of a leak in the casing by determining that the actual response time is greater than the expected response time.

3. The method of claim 2 wherein the location of the leak is determined by:
   monitoring a proportion of the tracer in the produced fluid as a function of time;
   quantifying the amount of the tracer returning from the well; and
   calculating the location of the leak.

4. A method for determining the absence of a leak in a casing in a gas-lift well in a subterranean reservoir comprising:
   injecting into lift-gas supplied to the well a quantity of an injected fluid, which is at least one of (1) a tracer and (2) a component which generates a tracer, the tracer being sufficient to be detected in a produced fluid and recovered from the well;
   monitoring a proportion of the tracer in the produced fluid as a function of time;
   quantifying the amount of the tracer returning from the well;
   determining that the amount of the tracer returning from the well is about equal to the amount that would return without any loss of the tracer, thereby determining the absence of a leak in the casing.

* * * * *